(12) United States Patent
Chang et al.

(10) Patent No.: US 11,550,422 B2
(45) Date of Patent: Jan. 10, 2023

(54) FLEXIBLE TOUCH SCREEN, TOUCH SENSITIVE PROCESSING APPARATUS AND METHOD, AND ELECTRONIC SYSTEM

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 17/380,262

(22) Filed: Jul. 20, 2021

(65) Prior Publication Data

US 2022/0019330 A1 Jan. 20, 2022

Related U.S. Application Data

(60) Provisional application No. 63/053,747, filed on Jul. 20, 2020.

(51) Int. Cl.
- *G06F 3/041* (2006.01)
- *G06F 3/044* (2006.01)
- *G06F 1/16* (2006.01)

(52) U.S. Cl.
CPC ........ *G06F 3/04164* (2019.05); *G06F 1/1652* (2013.01); *G06F 1/1656* (2013.01); *G06F 3/0412* (2013.01); *G06F 3/0445* (2019.05); *G06F 2203/04105* (2013.01)

(58) Field of Classification Search
CPC ...... G09F 9/301; G06F 1/1641; G06F 1/1652; G06F 1/1656; G06F 3/0412; G06F 3/04164; G06F 3/0445; G06F 2203/04102; G06F 2203/04105

See application file for complete search history.

(56) References Cited

U.S. PATENT DOCUMENTS

| | | | |
|---|---|---|---|
| 8,666,455 B2 * | 3/2014 | Song | H04M 1/0268 455/566 |
| 9,110,516 B2 * | 8/2015 | Hwang | G06F 1/1652 |
| 9,329,732 B2 * | 5/2016 | Chang | G06F 3/0443 |
| 11,176,878 B2 * | 11/2021 | Zhao | G09G 3/3225 |
| 2011/0241998 A1 * | 10/2011 | McKinney | H04M 1/0247 345/204 |
| 2013/0145311 A1 * | 6/2013 | Joo | G06F 3/0487 715/788 |
| 2014/0028596 A1 * | 1/2014 | Seo | G06F 3/03 345/173 |
| 2014/0049464 A1 * | 2/2014 | Kwak | G06F 3/017 345/156 |
| 2014/0062951 A1 * | 3/2014 | Chang | G06F 3/0442 345/174 |

(Continued)

Primary Examiner — Joe H Cheng
(74) Attorney, Agent, or Firm — WPAT, PC

(57) ABSTRACT

A flexible touch screen, comprising: a flexible display with a first bending line, wherein the first bending line separates the flexible display into a first part and a second part; and a first touch panel and a second touch panel disposed in different sides of the first bending line, wherein the first and the second touch panels attach to the flexible display, each of the first and the second touch panels comprises first electrodes and second electrodes which are connected with a touch sensitive processing apparatus, the first and the second electrodes intersect each other.

17 Claims, 7 Drawing Sheets

(56) References Cited

U.S. PATENT DOCUMENTS

| | | | |
|---|---|---|---|
| 2014/0078047 A1* | 3/2014 | Seo | G06F 3/0412 |
| | | | 345/156 |
| 2014/0101560 A1* | 4/2014 | Kwak | G06F 3/0488 |
| | | | 715/788 |
| 2014/0104222 A1* | 4/2014 | Chang | G06F 3/0443 |
| | | | 345/174 |
| 2015/0109250 A1* | 4/2015 | Chang | G06F 3/0445 |
| | | | 345/174 |
| 2015/0116608 A1* | 4/2015 | Jeong | G06F 3/04166 |
| | | | 349/12 |
| 2015/0153778 A1* | 6/2015 | Jung | H04M 1/0268 |
| | | | 345/156 |
| 2015/0220118 A1* | 8/2015 | Kwak | G06F 1/1622 |
| | | | 345/520 |
| 2015/0378557 A1* | 12/2015 | Jeong | H04M 1/0241 |
| | | | 715/835 |
| 2016/0209963 A1* | 7/2016 | Chang | G06F 3/04166 |
| 2017/0003793 A1* | 1/2017 | Gao | G09G 5/003 |
| 2017/0115801 A1* | 4/2017 | Shih | G06F 3/0412 |
| 2017/0168643 A1* | 6/2017 | Wang | G06F 3/0416 |
| 2019/0042042 A1* | 2/2019 | Hei | G06F 3/0445 |

\* cited by examiner

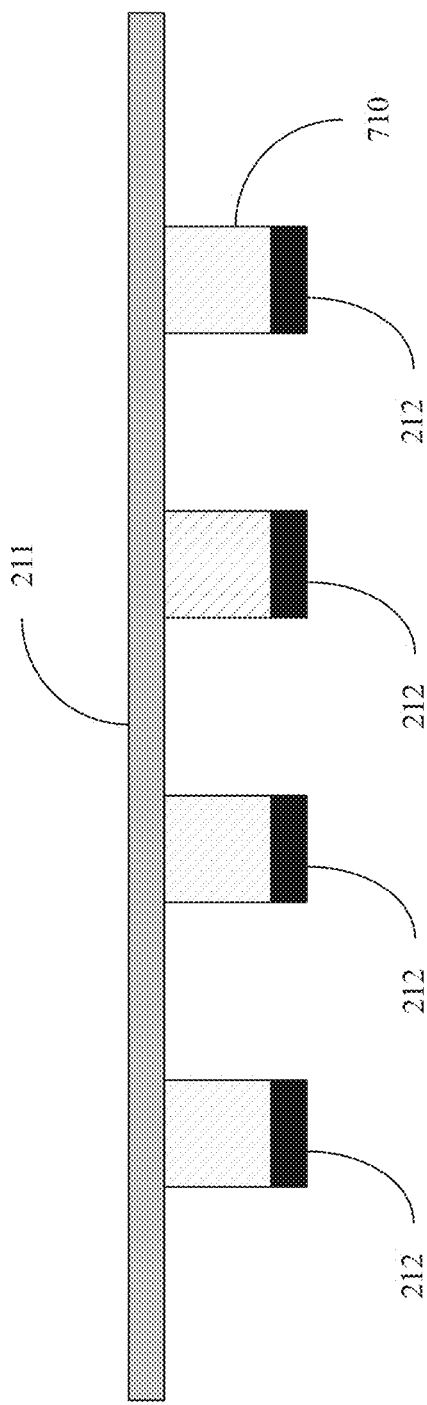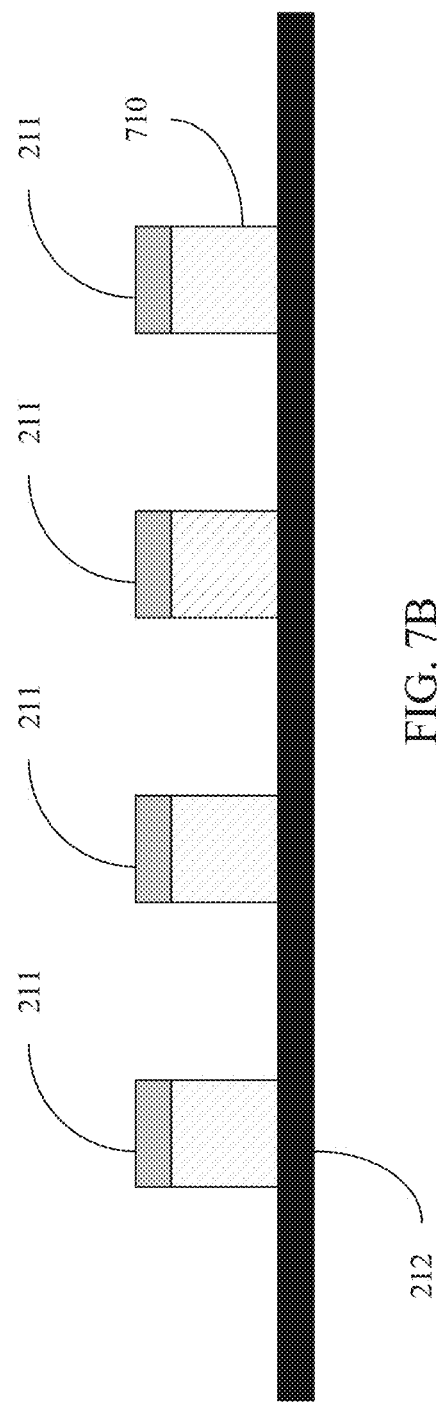

FLEXIBLE TOUCH SCREEN, TOUCH SENSITIVE PROCESSING APPARATUS AND METHOD, AND ELECTRONIC SYSTEM

CROSS REFERENCE TO RELATED PATENT APPLICATION

This patent application is based on a provisional patent application No. 63/053,747 filed on Jul. 20, 2020.

FIELD OF THE INVENTION

The present invention relates to touch screen, and more particularly, to flexible touch screens and their processing methods and apparatus.

BACKGROUND OF THE INVENTION

Electronic paper displays are widely adopted in equipment such as electronic book reader, electronic signage and etc. Electronic paper display is flexible. Other kinds of displays are also flexible. How to add touch sensitive function on flexible displays is the question the instant application intends to solve.

In the following, the instant application takes electronic paper touch screen as an embodiment of a flexible touch screen. However, person having ordinary skill in the art can understand the flexible touch screen may include flexible display other than electronic paper display.

SUMMARY OF THE INVENTION

According to the embodiments provided by the present application, multiple touch panels, separated by one or more bending lines, are provided to the top surface and/or bottom surface of a flexible electronic paper display. Each touch panel comprises multiple first electrodes and multiple second electrodes which intersect with each of the first electrodes. The first and the second electrodes are separated by an elastic layer. Each of the touch panel is corresponding to at least one part of four edges of the flexible electronic paper display such that the first and the second electrodes of the touch panel can connect to a touch sensitive processing apparatus through the part of the edge. The touch sensitive processing apparatus may at least use mutual-capacitance sensing to detect capacitance changes caused by distance variations between the first electrodes and the second electrodes. Accordingly, the touch sensitive processing apparatus can determine positions under pressure and/or pressure values which led to the distance variations.

According to an embodiment, the present application provides a flexible touch screen, comprising: a flexible display with a first bending line, wherein the first bending line separates the flexible display into a first part and a second part; and a first touch panel and a second touch panel disposed in different sides of the first bending line, wherein the first and the second touch panels attach to the flexible display, each of the first and the second touch panels comprises first electrodes and second electrodes which are connected with a touch sensitive processing apparatus, the first and the second electrodes intersect each other.

According to an embodiment, the present application provides a touch sensitive processing apparatus, adapted for a flexible touch screen, wherein the flexible touch screen comprising a flexible display with a first bending line, and a first touch panel and a second touch panel disposed in different sides of the first bending line, the first bending line separates the flexible display into a first part and a second part, the first and the second touch panels attach to the flexible display, each of the first and the second touch panels comprises first electrodes and second electrodes, the first and the second electrodes intersect each other, wherein the touch sensitive processing apparatus comprising: an interconnection network module, configured to connect the first electrodes and the second electrodes of the first and the second touch panels; a driving circuit module, configured to transmit driving signals via the interconnection network module; a sensing circuit module, configured to sense the driving signals via the interconnection network module; and a processor module, configured to execute instructions stored in non-volatile memory to realize following steps: have the driving circuit module takes turns to one of the first electrodes of the first touch panel emit first driving signals; have the driving circuit module takes turns to one of the first electrodes of the second touch panel emit second driving signals; when the first driving signals being emitted in turns, have the sensing circuit module to sense the first driving signals via the second electrodes of the first touch panel to get multiple first one-dimension sensing information; when the second driving signals being emitted in turns, have the sensing circuit module to sense the second driving signals via the second electrodes of the second touch panel to get multiple second one-dimension sensing information; forming a first two-dimension sensing information by the multiple first one-dimension sensing information according to positions of the first electrodes emitting the first driving signals corresponding to the multiple first one-dimension sensing information; forming a second two-dimension sensing information by the multiple second one-dimension sensing information according to positions of the first electrodes emitting the second driving signals corresponding to the multiple second one-dimension sensing information; and according to the first and the second two-dimension sensing information, detecting an external conductive object corresponding to the first and the second touch panels, respectively.

According to an embodiment, the present application provides a touch sensitive processing method, adapted for a flexible touch screen, wherein the flexible touch screen comprising a flexible display with a first bending line, and a first touch panel and a second touch panel disposed in different sides of the first bending line, the first bending line separates the flexible display into a first part and a second part, the first and the second touch panels attach to the flexible display, each of the first and the second touch panels comprises first electrodes and second electrodes, the first and the second electrodes intersect each other, wherein the touch sensitive processing method comprising: taking turns to one of the first electrodes of the first touch panel emit first driving signals; taking turns to one of the first electrodes of the second touch panel emit second driving signals; when the first driving signals being emitted in turns, sensing the first driving signals via the second electrodes of the first touch panel to get multiple first one-dimension sensing information; when the second driving signals being emitted in turns, sensing the second driving signals via the second electrodes of the second touch panel to get multiple second one-dimension sensing information; forming a first two-dimension sensing information by the multiple first one-dimension sensing information according to positions of the first electrodes emitting the first driving signals corresponding to the multiple first one-dimension sensing information; forming a second two-dimension sensing information by the multiple second one-dimension sensing information according to positions of the first electrodes emitting the second driving signals corresponding to the multiple second one-dimension sensing information; and according to the first and the second two-dimension sensing information, detecting an external conductive object corresponding to the first and the second touch panels, respectively.

According to an embodiment, the present application provides an electronic system comprising the flexible touch screen and the touch sensitive processing apparatus.

BRIEF DESCRIPTION OF THE DRAWINGS

The advantages and spirit related to the present invention can be further understood via the following detailed description and drawings.

FIGS. 7A and 7B depict two profile diagrams of a flexible touch screen 700 in accordance with an embodiment of the present invention.

DETAILED DESCRIPTION OF THE PREFERRED EMBODIMENT

Figure 1A:
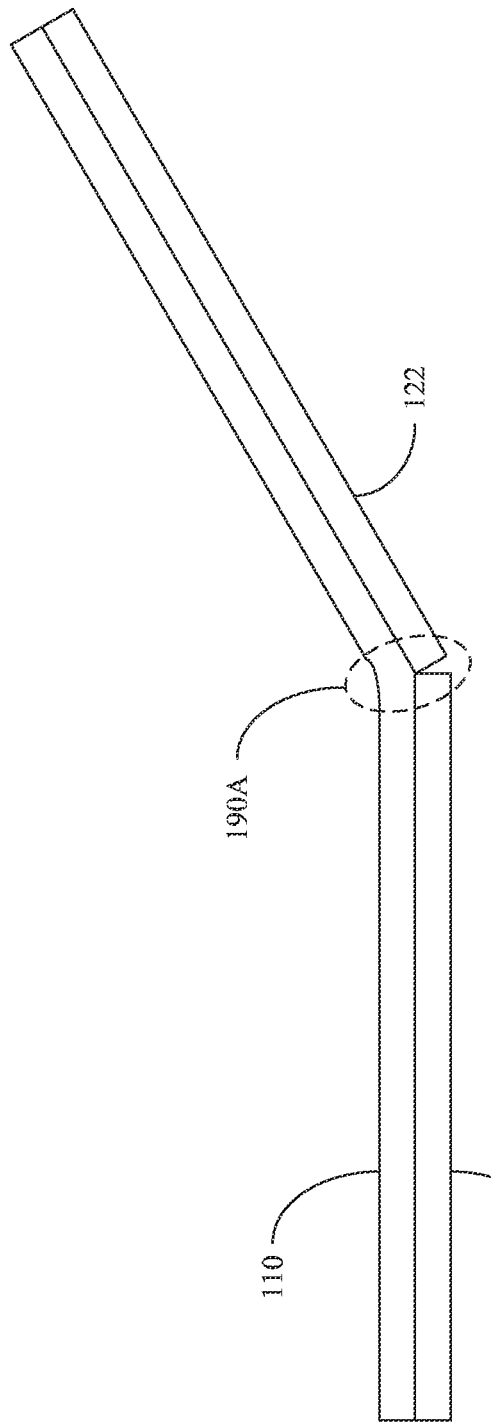
FIG. 1A shows a profile view of a flexible touch screen 100 in accordance with an embodiment of the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1A, which shows a profile view of a flexible touch screen 100 in accordance with an embodiment of the present application. The flexible touch screen 100 may server an input and output apparatus of an electronic system. The flexible touch screen 100 comprises an electronic paper display 110 or a flexible display 110 and two touch panels 121 and 122 disposed behind the electronic paper display 110 or the flexible display 110.

As shown in FIG. 1A, there is a bending line 190A in the middle of the electronic paper display or the flexible display 110. Since it is easier to be bended in the bending line 190A, when user bends the electronic paper display or the flexible display 110, the electronic paper display or the flexible display 110 deforms at the bending line 190A at first. Rest of the display 110 does not deform as much as the bending line 190A. The touch panel 121 is disposed in one side of the bending line 190A and the touch panel 122 is disposed in another side of the bending line. The touch panel 121 essentially covers bottom surface of the electronic paper display or the flexible display 110 in the left side of the bending line 190A. The touch panel 122 essentially covers bottom surface of the electronic paper display or the flexible display 110 in the right side of the bending line 190A. Although the bending line as shown in FIG. 1A is positioned in the middle of an edge of the electronic paper display or the flexible display 110, the present invention does not limit the position or the direction of the bending line and quantity of the bending lines. In a preferred embodiment, display surface of the electronic paper display or the flexible display 110 is a rectangle. The bending line is in parallel to an edge of the rectangle.

When one or more fingers or pen-like objects touch the electronic paper display the flexible display 110, since the electronic paper display the flexible display 110 is flexible, pressure makes the touched part of the electronic paper display the flexible display 110 deforms. Accordingly, the deformation delivers pressure to the touch panel 121 or 122 underneath. Corresponding part of the touch panel 121 or 122 is also deformed in response to the pressure.

Multiple touch electrodes included in the touch panel 121 or 122 connect to a touch sensitive processing apparatus. The touch sensitive processing apparatus may detect the deformation according to capacitance changes between the touch electrodes, and further determine the position of the touch panel 121 or 122 being pressed. Consequently, the input position of the user points to the flexible touch screen 100 can be detected.

In the embodiment as shown in FIG. 1A, since the touch panel 121 or 122 is disposed behind the electronic paper display or the flexible display 110, the touch panel 121 or 122 is less sensitive to pressure. User has to press harder to the electronic paper display or the flexible display 110 as well as the touch panel 121 or 122. Hence, in order to increase sensitivity of the flexible touch screen 100, the embodiment as shown in FIG. 1B is preferred instead.

Figure 1B:
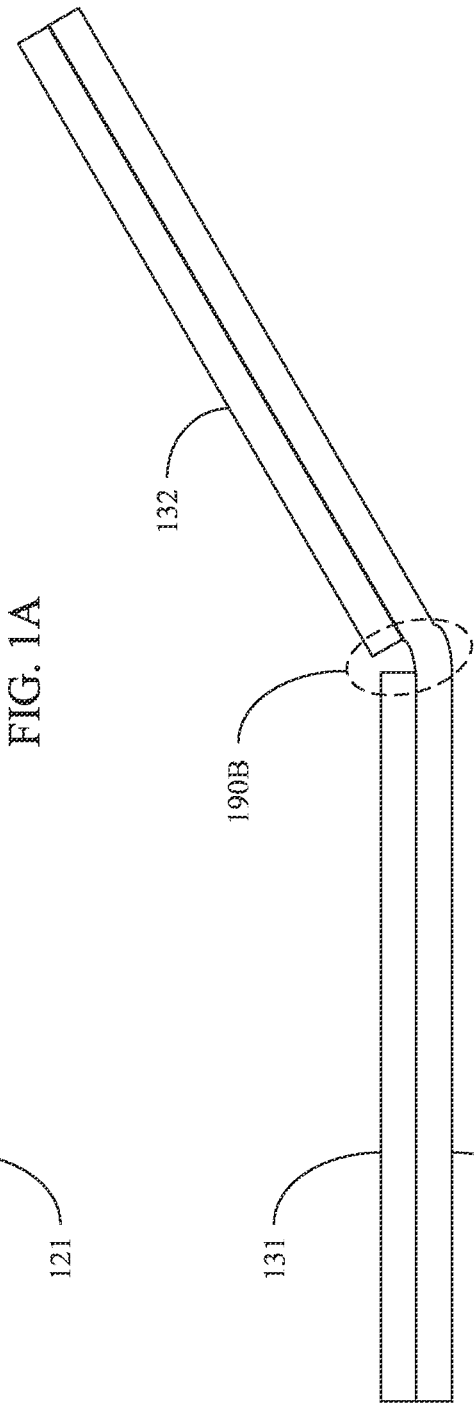
FIG. 1B depicts a profile view of a flexible touch screen 100 in accordance with another embodiment of the present application.

Please refer to FIG. 1B, which depicts a profile view of a flexible touch screen 100 in accordance with another embodiment of the present application. The flexible touch screen 100 comprises the electronic paper display or the flexible display 110 and two touch panels 131 and 132 in front of the electronic paper display or the flexible display 110. The touch panel 131 essentially covers top surface of the electronic paper display or the flexible display 110 in the left side of the bending line 190B. The touch panel 132 essentially covers top surface of the electronic paper display or the flexible display 110 in the right side of the bending line 190B. Because of the bending, there may be a slot between the touch panels 131 and 132. However, in a variant, transparent flexible material may be used to be filled in the slot in order to prevent dusts being filled in.

Since the touch panel 131 or 132 is disposed on top of the electronic paper display or the flexible display 110, user may press softer to deform the touch panel 131 or 132. In alternative embodiments, it may use self-capacitance or mutual-capacitance principles which are not caused by deformation to detect one or more objects touching or approximating the touch panel 131 or 132.

However, in order to let user see display content of the electronic paper display or the flexible display 110, all of entire materials of the touch panel 131 or 132 must be transparent. With regard to the embodiment as shown in FIG. 1A, since the touch panel 121 or 122 are disposed behind the electronic paper display or the flexible display 110, opaque materials may be used for the touch panel 121 or 122. In the measure of costs, opaque touch panel 121 or 122 may be cheaper than transparent touch panel 131 or 132.

Figure 2:
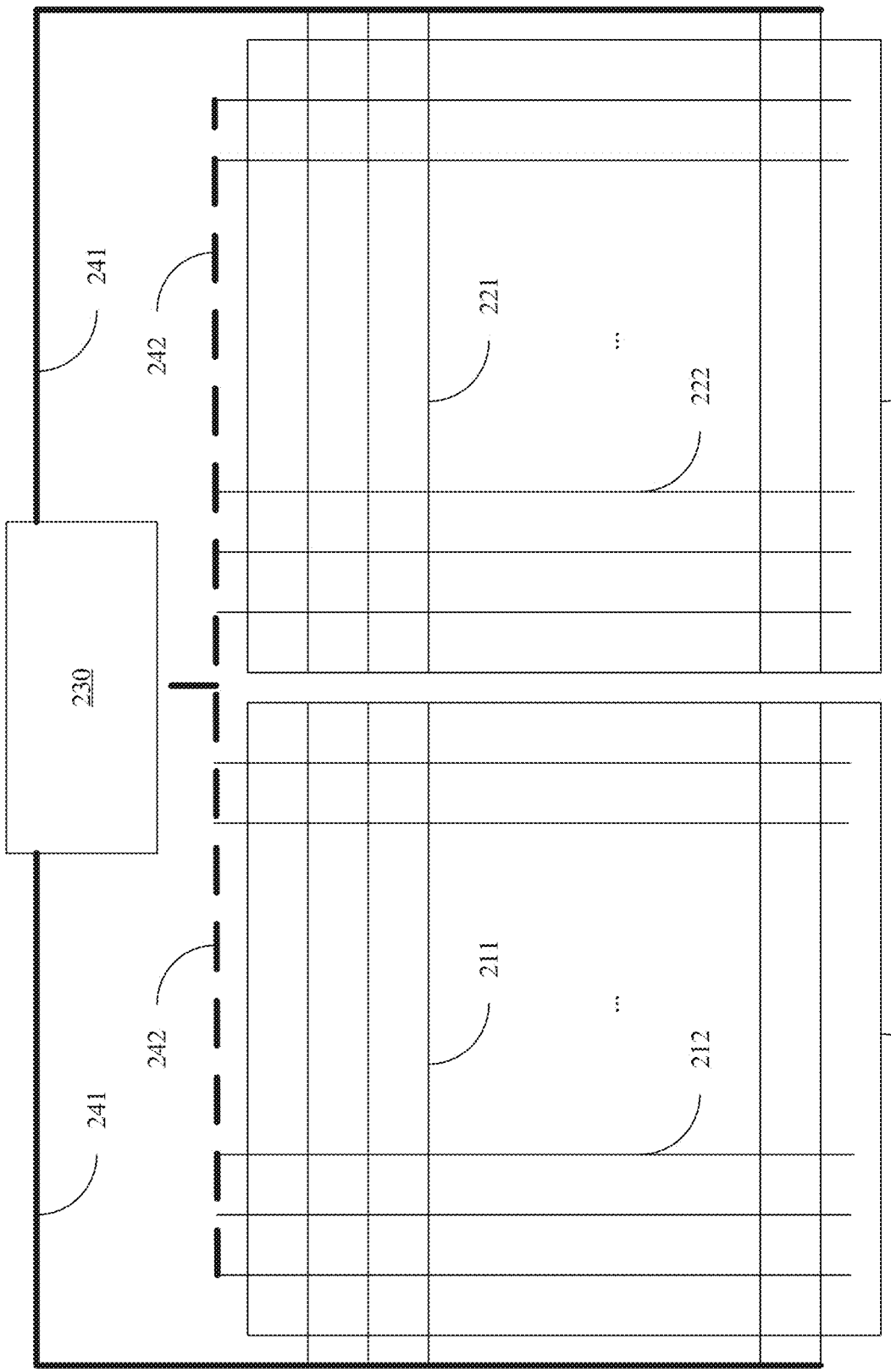
FIG. 2 shows a diagram of a touch system 200 in accordance with an embodiment of the present application.

Please refer to FIG. 2, which shows a diagram of a touch system 200 in accordance with an embodiment of the present application. The touch system 200 may be an input sub-system of an electronic system. The touch system 200 comprises a touch sensitive processing apparatus 230 configured to connect to touch panels. The touch panels may be the touch panel 121 or 122 as shown in FIG. 1A or the touch panel 131 or 132 as shown in FIG. 1B. They are configured to provide touch sensitive function of corresponding electronic paper display or the flexible display 110. Though in the embodiment as shown in FIG. 2, what connected by the touch sensitive processing apparatus 230 are the touch panels 121 and 122. Person having ordinary skill in the art can understand the touch panels 121 and 122 as shown in FIG. 2 may be replaced by the touch panel 131 and 132, respectively.

As shown in FIG. 2, the touch panels 121 and 122 cover bottom surface of the electronic paper display or the flexible display 110. The touch panel 121 comprises multiple first electrodes 211 in parallel to a first direction and multiple second electrodes 212 in parallel to a second direction. Similarly, the touch panel 122 comprises multiple first electrodes 221 in parallel to the first direction and multiple second electrodes 222 in parallel to the second direction. In other words, the first electrodes 211 and 221 are in parallel to the first direction. The second electrodes 212 and 222 are in parallel to the second direction.

In the touch panel 121 or 122, each of the first electrodes intersects with the second electrodes in multiple intersections. However, they are not electrically coupled. Each of the first electrodes 211 and 221 as well as each of the second electrodes 212 and 222 connects to the touch sensitive processing apparatus 230.

In one embodiment, when areas of the touch panels 121 and 122 essentially equal, quantity of the first electrodes 211 may equal to quantity of the first electrodes 221 and each of the first electrodes 211 and one of the first electrodes 221 are aligned in one axis. Quantity of the second electrodes 212 may equal to quantity of the second electrodes 222. In an alternative embodiment, when the areas of the touch panels 121 and 122 are not the same, in order to maintain identical design or configuration, quantity of the first electrodes 211 may equal to quantity of the first electrodes 221 and quantity of the second electrodes 212 may equal to quantity of the second electrodes 222 although the touch resolutions of these two touch panels 121 and 122 are different.

In one embodiment, when the areas of the touch panels 121 and 122 are different, in order to maintain identical touch resolution, quantity of the first electrodes 211 may be different from quantity of the first electrodes 221. However, intervals of the first electrodes 211 may equal to intervals of the first electrodes 221. Quantity of the second electrodes 212 may be different from quantity of the second electrodes 222. However, intervals of the second electrodes 212 may equal to intervals of the second electrodes 222.

In an alternative embodiment, when the areas or the shapes of the touch panels 121 and 122 are different, in order to adapt to different shapes or to have different touch resolution, these two touch panels 121 and 122 may have different quantities of touch electrodes. More precisely, quantity of the first electrodes 211 may be different from quantity of the first electrodes 221. Intervals of the first electrodes 211 may be different from intervals of first electrodes 221. Quantity of the second electrodes 212 may be different from quantity of the second electrodes 222. Intervals of the second electrodes 212 may be different from intervals of second electrodes 222.

As shown in FIG. 2, the first electrodes 211 of the touch panel 121 may be aggregated as a bus 241 from the left edge in order to connect to the touch sensitive processing apparatus 230. The second electrodes 212 may be aggregated as a bus 242 from the top edge or the bottom edge in order to connect to the touch sensitive processing apparatus 230. Similarly, the first electrodes 221 of the touch panel 122 may be aggregated as a bus 241 from the right edge in order to connect to the touch sensitive processing apparatus 230. The second electrodes 222 may be aggregated as a bus 242 from the top edge or the bottom edge in order to connect to the touch sensitive processing apparatus 230.

When the bus is arranged in the bending line, after numbers of bending, insulations of circuits of the bus may be gradually deteriorated, circuits may be aged due to metal fatigues, or circuits may be broken. Hence, in some embodiments, bus is not arranged in the bending line.

In this embodiment, in order to save cost, one touch sensitive processing apparatus 230 may connect to two or more touch panels. And one single touch sensitive processing apparatus 230 may simultaneously detects via multiple touch panels. When using multiple touch sensitive processing apparatuses 230 detects via multiple touch panels, it requires central processing unit or other components or software to coordinate the operations of concurrent detections.

Besides, when the electronic paper display or the flexible display 110 being bended such that two touch panels approaches to each other, driving signals emitted by the touch panels during the self-capacitance or mutual capacitance detections may interference another touch panel. A single touch sensitive processing apparatus connecting two touch panels can detect the interferences and cease capacitance detections of these two touch panels. Or it performs capacitance detection with one touch panel in one time to prevent another touch panel being interfered.

When the electronic paper display or the flexible display 110 being bended such that two touch panels contact and being pressed from each other, pressure of a position is corresponding to a distance between the position and the bending line. In other words, the part of the touch panel which is closer to the bending line may be under greater pressure. Reversely, other part of the touch panel which is farther from the bending line may be under less pressure. The touch sensitive processing apparatus 230 may recognize the pressure gradient pattern. When both detection results of two adjacent touch panels show the aforementioned pressure gradient patterns, the capacitance detections of these two touch panels may be paused. Furthermore, the touch sensitive processing apparatus 230 may notify central processing unit and/or operating system of electronic system that the two touch panels are already in contact. The central processing unit and/or the operating system may pause operations of the electronic system or enter a sleep mode.

In one embodiment, if an object, e.g., a stylus, is sandwiched between the two touch panels, the touch sensitive processing apparatus 230 may recognize that there are objects with similar shapes pressing in two mapped locations of the two touch panels corresponding to the bending line. Since user cannot use these two touch panels anymore, the touch sensitive processing apparatus 230 may suspend capacitance detections of these two touch panels. Furthermore, the touch sensitive processing apparatus 230 may notify central processing unit and/or operating system of electronic system that there is an object sandwiched in between. The central processing unit and/or the operating system may further notify user to remove the object by acoustic or visual signals in order to prevent the object cause permanent damages to the electronic paper display or the flexible display 110 as well as these two touch panels.

Figure 3:
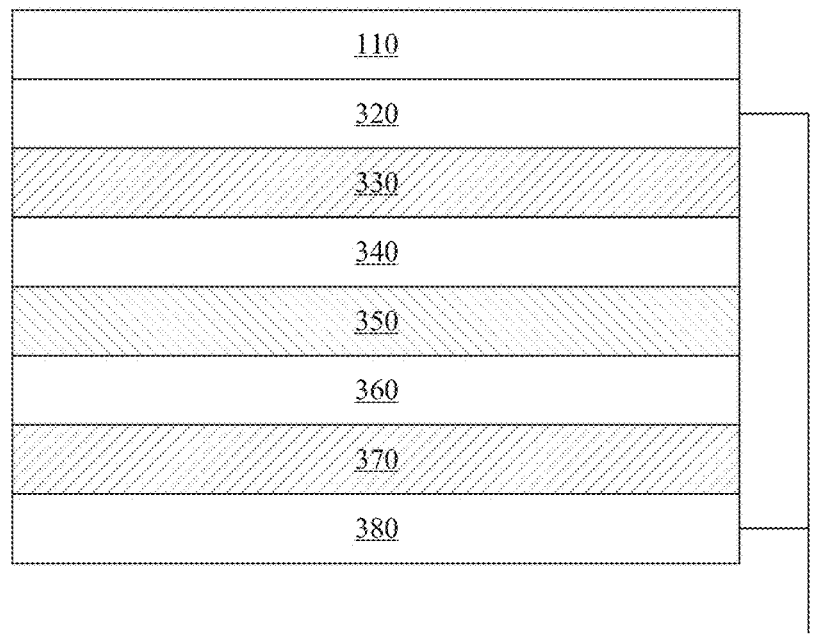
FIG. 3 illustrates a profile diagram of a flexible touch screen 300 in accordance with an embodiment of the present application.

Please refer to FIG. 3, which illustrates a profile diagram of a flexible touch screen 300 in accordance with an embodiment of the present application. The flexible touch screen 300 may be the flexible touch screen 100 of the embodiment as shown in FIG. 1A. Multiple layers are included in the flexible touch screen 100. Beginning with the electronic paper display or the flexible display 110 which is the closest to user's eyes, it sequentially include following layers.

Optional first electromagnetic shielding layer 320: it may comprise a sheet of conductive material such as metal sheet, metal film or metal grids. The area of the sheet may equals to the area of the touch panel. The first electromagnetic shielding layer 320 may connect to ground level of the electronic system or a direct current potential in order to shield electromagnetic interference from and to the electronic paper display or the flexible display 110. When the electronic paper display or the flexible display 110 has its own shielding layer, the flexible touch screen 300 may not need the electromagnetic shielding layer 320.

Optional first dielectric layer 330: when the flexible touch screen 300 includes the electromagnetic shielding layer 320, the first dielectric layer is configured to dielectric the upper first electromagnetic shielding layer 320 and a lower layer of first electrodes 340.

The layer of first electrodes 340: it includes the first electrodes 211 or 221.

Elastic dielectric layer 350: the elastic dielectric layer 350 may be a whole layer of elastic dielectric layer, or it may comprise multiple elastic structures in order to dielectric the layer of first electrodes 340 and a layer of second electrodes 360.

The layer of second electrodes 360: it comprises the second electrodes 212 or 222. In one embodiment, the positions of the layer of first electrodes 340 and the layer of second electrodes 360 are exchanged.

Optional second dielectric layer 370: when the flexible touch screen 300 includes a second electromagnetic shielding layer 380, the second dielectric layer 370 is configured to dielectric the upper layer of second electrodes 360 and the lower electromagnetic shielding layer 380.

Optional second electromagnetic shielding layer 380: it may comprise a sheet of conductive material such as metal sheet, metal film or metal grids. The area of the sheet may equals to the area of the touch panel. The second electromagnetic shielding layer 380 may connect to ground level of the electronic system or a direct current potential in order to shield electromagnetic interference from and to other components of the electronic system.

When under pressure, the electronic paper display or the flexible display 110 and the elastic dielectric layer 350 of the flexible touch screen 300 deform accordingly. Hence, distances between the first electrodes and the second electrodes located in the corresponding portion are shorten so as the touch sensitive processing apparatus can detect capacitance changes in the portion corresponding to pressure. According to one or more quantities of capacitance changes, locations under pressure and quantities of pressure can be calculated.

In an embodiment, since the electronic paper display or the flexible display 110 is closest to the user and they shade the layers 320~380, the layers 320~380 does not need to be transparent.

Figure 4:
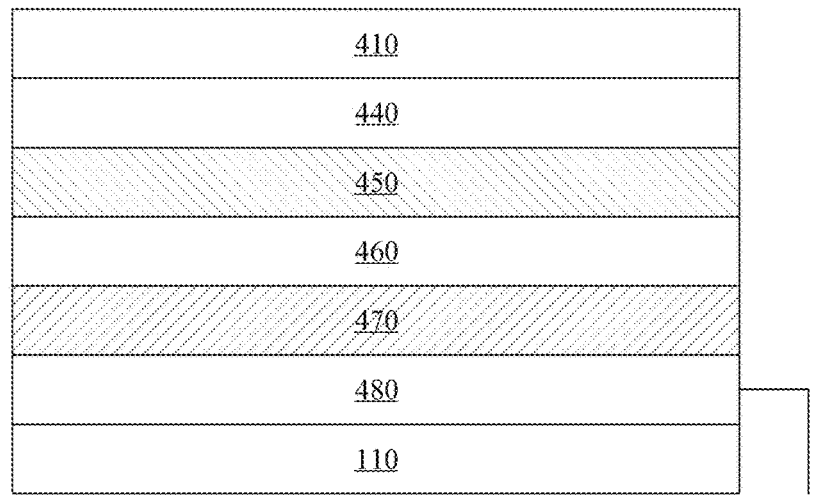
FIG. 4 depicts a profile diagram of a flexible touch screen 400 in accordance with an embodiment of the present application.

Please refer to FIG. 4, which depicts a profile diagram of a flexible touch screen 400 in accordance with an embodiment of the present application. The flexible touch screen 400 may be the flexible touch screen 100 of the embodiment as shown in FIG. 1B. It comprises sequentially following layers until the electronic paper display or the flexible display 110 which is the most far from users' eyes.

Transparent protection layer 410: in order to protect structures underneath from damages caused by foreign objects, the flexible touch screen 400 has to include a transparent protection layer 410. In one embodiment, the transparent protection layer 410 may be a layer of glass or plastics.

Transparent layer of first electrodes 440: it comprises the first electrodes 211 or 221. The first electrodes 211 or 211 must be made by transparent materials.

Transparent elastic dielectric layer 450: the elastic dielectric layer 450 may be a whole layer of elastic dielectric layer or it may comprise multiple elastic structures in order to dielectric the layer of first electrodes 440 and the layer of second electrodes 460. In one embodiment, the flexible touch screen 400 may replace the transparent elastic dielectric layer with a transparent dielectric layer. Utilizing mutual-capacitance or self-capacitance principles, the touch sensitive processing apparatus can detect external conductive object touching or approximating the transparent protection layer 410 via the first electrodes in the layer of first electrodes 440 and the second electrodes in the layer of second electrodes 460.

Transparent layer of second electrodes 460: it includes the second electrodes 212 or 222. The second electrodes 212 or 222 must be made by transparent materials. In one embodiment, the positions of the layer of first electrodes 440 and the layer of second electrodes 460 are exchanged.

Optional transparent dielectric layer 470: when the flexible touch screen 400 includes a transparent electromagnetic shielding layer 480, the transparent dielectric layer 470 is configured to dielectric the upper layer of second electrodes 460 and the lower electromagnetic shielding layer 480.

Optional transparent electromagnetic shielding layer 480: it may comprise a sheet of conductive material such as metal sheet, metal film or metal grids. The area of the sheet may equals to the area of the touch panel. The transparent electromagnetic shielding layer 480 may connect to ground level of the electronic system or a direct current potential in order to shield electromagnetic interference from and to the electronic paper display or the flexible display 110.

When under pressure, the electronic paper display or the flexible display 110 and the elastic dielectric layer 450 of the flexible touch screen 400 deform accordingly. Hence, distances between the first electrodes and the second electrodes located in the corresponding portion are shorten so as the touch sensitive processing apparatus can detect capacitance changes in the portion corresponding to pressure. According to one or more quantities of capacitance changes, locations under pressure and quantities of pressure can be calculated.

In one embodiment, the transparent elastic dielectric layer 450 of the flexible touch screen 400 may be removed. And the transparent layer of first electrodes 440 and the transparent layer of second electrodes 460 may be combined into one layer of electrodes. Each of the first electrodes and the second electrodes comprises multiple conductive sheets. Different conductive sheets cover different parts of surfaces of the flexible touch screen 400. Bridging lines are used to connect to multiple conductive sheets of the same first electrode. Connecting lines are used to connect to multiple conductive sheets of the second electrode. Each of the first electrodes intersects with multiple second electrodes. However, since the bridging line disposed where the connecting line is used to connect two conductive sheets, the first electrodes are not electrically coupled to the second electrodes. In this structure of the single layer of electrodes, the distances between the first electrodes and the second electrodes are not being changed.

Like the embodiment with non-elastic transparent dielectric layer 450, the detecting principle of these two embodiments does not include detection of capacitance changes caused by distance variation between the first electrodes and/or the second electrodes. It is configured to detect capacitance changed caused by the external conductive object touching or approximating the transparent protection layer 410.

Figure 5:
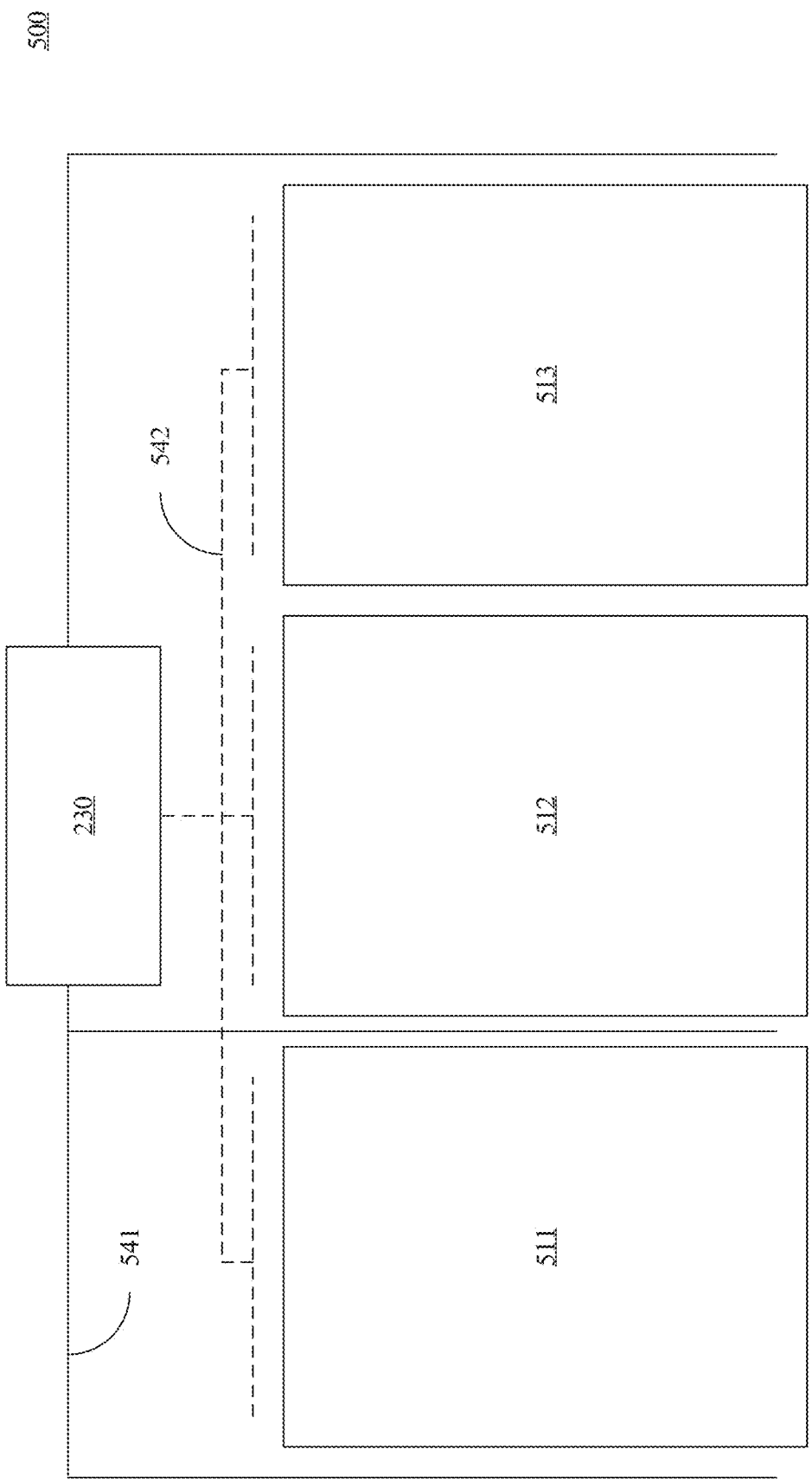
FIG. 5 shows a diagram of a touch system 500 in accordance with an embodiment of the present application.

Please refer to FIG. 5, which shows a diagram of a touch system 500 in accordance with an embodiment of the present application. Comparing with the touch system 200 as shown in FIG. 2, the touch system 500 sequentially comprises three touch panels 511, 512 and 513 which are separated by two parallel bending lines. First electrodes of the left touch panel 511 may be aggregated from the left side as a bus 541. First electrodes of the right touch panel 513 may be aggregated from the right side as a bus 541. First electrodes of the middle touch panel 512 may be aggregated along the left bending line from the top side or the bottom side as a bus 541.

In an alternative embodiment, the first electrodes of the middle panel 512 may be aggregated along the left or the right bending lines from the top side or the bottom side as the bus 541 so as width of circuits in the bending lines can be reduced.

Although the embodiment as shown in FIG. 5 includes only two vertical bending lines, person having ordinary skill in the art can understand that the touch system 500 may comprise more than two parallel bending lines. When quantity of the parallel bending lines is large enough, the touch system 500 may be bended as a cylinder. That is the left and the right sides of the electronic paper display or the flexible display 110 contact each other. Even more, part of the electronic paper display or the flexible display 110 is bended inside the cylinder. Thus a reel is formed.

Except for the bending lines in parallel to one direction, person having ordinary skill in the art can understand the touch system 500 may include a bending line perpendicular to the direction such that each of the touch panels is corresponding to a part of four edges of the electronic paper display or the flexible display 110. Thus, one of the first electrodes and the second electrodes of each touch panel can be aggregated from the part of the edges as a bus. Another one of the first electrodes and the second electrodes of each touch panel can be aggregated along the bending line as another bus. Accordingly, the touch sensitive processing apparatus can detect capacitance changes caused by distance variations between the first electrodes and the second electrodes of each touch panel so as positions under pressure and quantities of pressure can be determined.

In one embodiment, the touch system 500 may comprise multiple bending lines. They may not be in parallel or not be perpendicular to each other. In such circumstance, each touch panel can correspond to a part of edges of the electronic paper display or the flexible display 110 so that one of the first and the second electrodes of the touch panel may be aggregated from the part of edges as a bus. Another one of the first and the second electrodes of the touch panel may be aggregated along the bending line as another bus. The touch sensitive processing apparatus is able to connect each of the first and the second electrodes of each touch panel. Consequently, the touch sensitive processing apparatus may detect capacitance changes caused by distance variations between the first electrodes and the second electrodes of each touch panel and may determine where being pressed and magnitude of the pressure.

Figure 6:
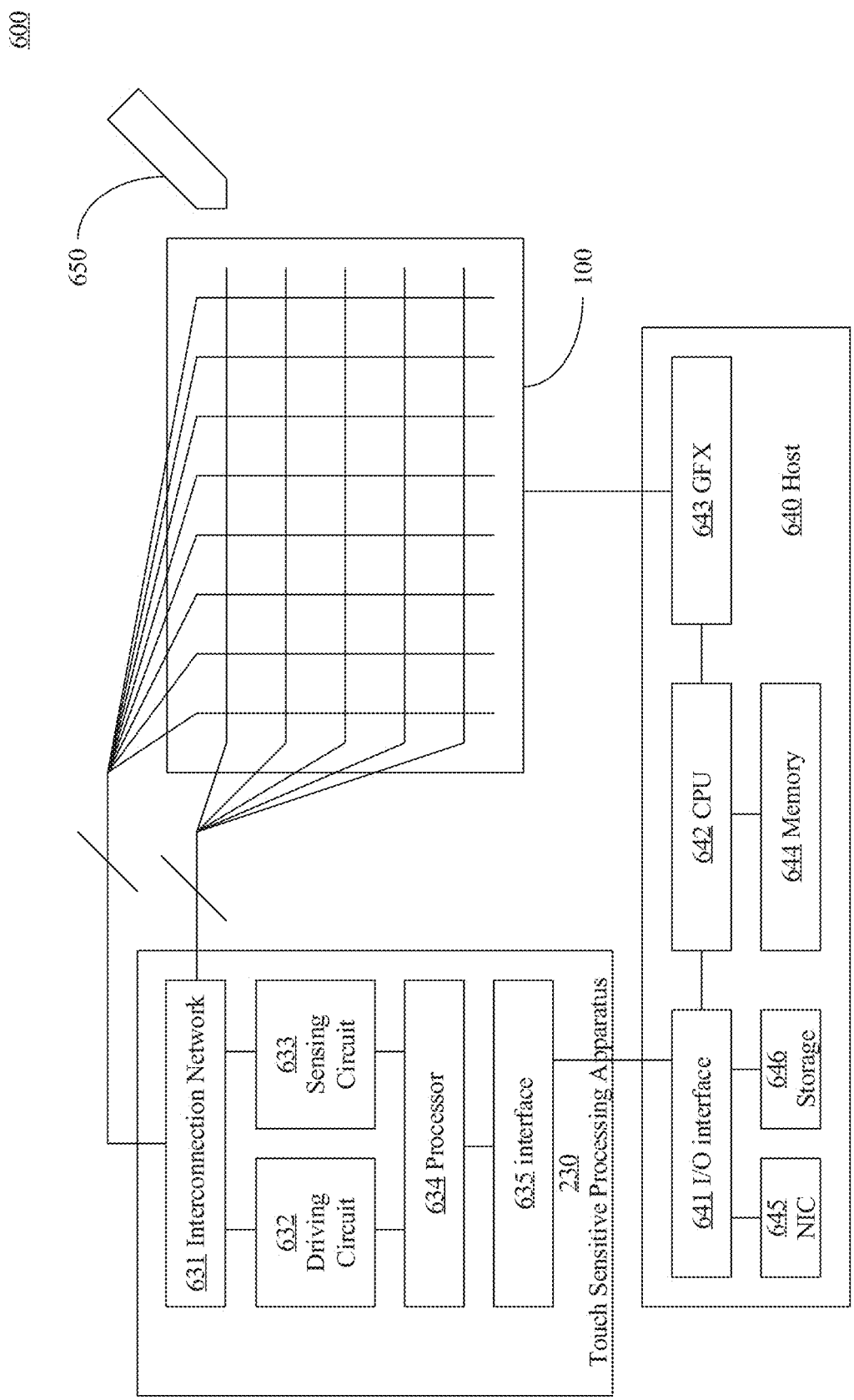
FIG. 6 shows a block diagram of an electronic system 600 in accordance with an embodiment of the present application.

Please refer to FIG. 6, which shows a block diagram of an electronic system 600 in accordance with an embodiment of the present application. The electronic system 600 comprises a flexible touch screen 100, a touch sensitive processing apparatus 230, a host 640 and an optional stylus 650. The host 640 may comprises an input/output interface 641, a central processing unit (CPU) 642, a graphics processor 643, and a memory module 644. The input/output interface 641 may use one or more industrial standard interface for connecting the touch sensitive processing apparatus 230, a network interface card (NIC) 645 and a storage device 646. These industrial standard interfaces may include I2C, PCT, PCI-Express, USB, SCSI, and etc. The CPU 642 is configured to execute operating system and applications stored in the memory module 644 for controlling operations of the electronic system 600. The graphics processor 643 is connected to the electronic paper display of the flexible touch screen 100 for controlling display of the electronic paper display.

As shown in FIG. 1A or FIG. 1B, the flexible touch screen 100 may comprises an electronic paper display 110 or a flexible display 110 for output and two touch panels 121 and 122 behind the electronic paper display or the flexible display 110 or two touch panels 131 and 132 in front of the electronic paper display or the flexible display 110. The touch sensitive processing apparatus 230 may comprises an interconnection network 631, a driving circuit module 632, a sensing circuit module 633, a processor module 634 and an interface module 635. The interconnection network 631 may include various multiplexers configured to connect to each of the first electrodes and the second electrodes of each touch panel, and configured to connect one or more of the first electrodes and/or the second electrodes with the driving circuit module 632 or the sensing circuit module 633.

In one embodiment, the processor module 634 may have the interconnection network 631 takes turn to connect one of the first electrodes of one of the touch panels with the driving circuit module 632 and have the interconnection network 632 simultaneously connect all of the second electrodes of the touch panel with the sensing circuit module 633. In a variant, the processor module 634 may also have the interconnection network 632 connects rest of the first electrodes which are not connected to the driving circuit module 632 to a ground level or a direct current potential in order to shield electromagnetic interference from signals emitted by the first electrodes being driven to the rest of first electrodes. Each time one of the first electrodes is connected, the driving circuit module 632 may transmits driving signals to the connected first electrode. Since all of the second electrodes of the touch panel intersected with the first electrodes, the driving signals would be induced by all of the second electrodes. The sensing circuit module 633 can detect sensed signals of the second electrodes. After each driving, the processor module 634 can receive a sequence composed of multiple sensing information. After the touch panel is driven, an array, or a sensing image, can be formed by these sequences according to the positions of first electrodes the sequences correspond.

Based on the sensing information, when adapting to the flexible touch screens as shown in FIG. 1A, 1B, 3 or 4, the processor module 634 can find one or more touching positions on the touch panel. The processor module 634 may further finds out a maximum pressure value of the touching position based on the sensing information corresponding to the touching position. When adapting to the touch panel on top of the electronic paper display as shown in FIG. 1B and there is no elastic layer between the layer of first electrodes and the layer of second electrodes, the processor module 634 may not detect pressure value but it is possible to detect external conductive object hovering and approximating. In addition to detect external conductive object, when the stylus actively transmits electrical signals, the processor module 634 can use the first electrodes and the second electrodes to detect the electrical signals so as the position where the stylus touching or approximating the touch panel is determined.

The detection method can be performed on every touch panel simultaneously. In other words, when the touch sensitive processing apparatus 230 has enough circuits to perform driving and sensing with electrodes of multiple touch panels, it can simultaneously perform detection methods on multiple touch panels to detect positions and/or pressure values.

After the positions and/or pressure values corresponding to the touch panels are detected, the processor module 634 transfers the sensed result to the host 640 via the interface module 645. The input/output interface 641 would notify the sensed result to the operating system executed by the CPU 642. The operating system would notify corresponding application to react to the sensed result.

In one embodiment, after the sensed results of all of the touch panels are calculated, the touch sensitive processing apparatus 230 may collect them and convert into coordinate values of the flexible touch screen 100. At the end, the touch sensitive processing apparatus 230 transfers the coordinate values and/or pressure values to the host 640.

Please refer to FIGS. 7A and 7B which depict two profile diagrams of a flexible touch screen 700 in accordance with an embodiment of the present invention. The profile diagram as shown in FIG. 7A is dissected along the direction of the first electrode 211. Perpendicular to the direction as shown in FIG. 7A, the profile diagram as shown in FIG. 7B is dissected along the direction of the second electrode 212.

As shown in FIG. 7A, between the first electrode 211 and the multiple intersected second electrodes 212, there are multiple elastic dielectric structures 710 sandwiched where the first electrode 211 crosses the second electrodes 212. As shown in FIG. 7B, between the second electrode 212 and the multiple intersected first electrodes 211, there are also multiple elastic dielectric structures 710 sandwiched where the first electrodes crosses the second electrode 212.

Although as shown in FIGS. 7A and 7B, the elastic dielectric structures 710 may be a cylinders or a cubes, the present application does not limit the shape, size and thickness of the elastic dielectric structures 710. They are required to be sandwiched between the first electrodes 211 cross the second electrodes 212 in order to prevent the first electrodes 211 directly contact the second electrodes 212 and to provide resilient force. When under no pressure, the positions of the first electrodes 211 and the second electrodes 212 can be within a certain distance range.

The elastic dielectric layer 350 as shown in FIG. 3 may include multiple of the elastic dielectric structures 710. The transparent dielectric layer 450 as shown in FIG. 4 may include multiple of the elastic dielectric structures 710, too. Other materials may be filled between the multiple elastic dielectric structures 710.

Figure 8:
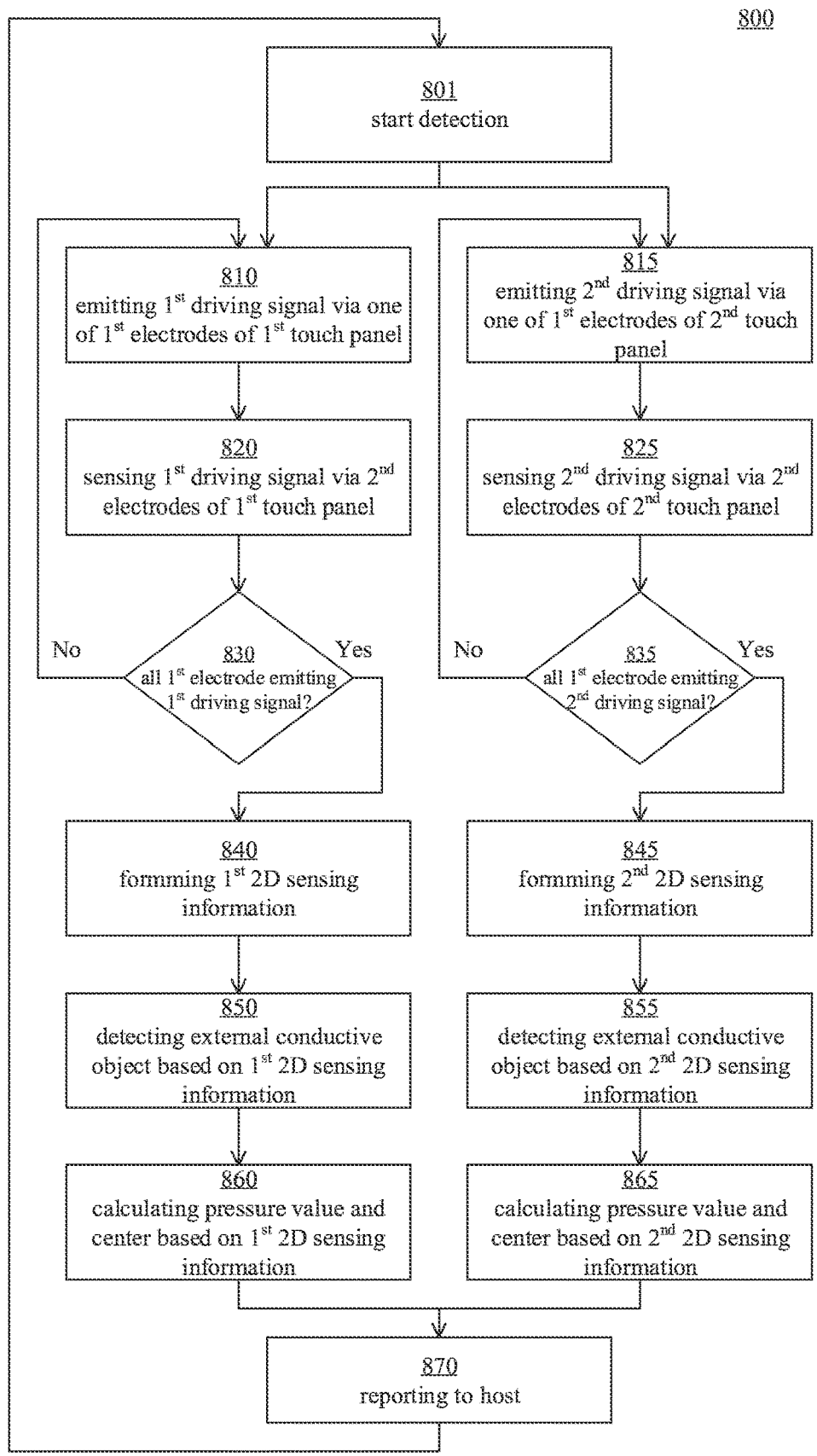
FIG. 8 shows a flowchart diagram of a touch sensitive processing method 800 in accordance with an embodiment of the present application.

Please refer to FIG. 8, which shows a flowchart diagram of a touch sensitive processing method 800 in accordance with an embodiment of the present application. The touch sensitive processing method 800 may be realized by the touch sensitive processing apparatus 230 as shown in FIG. 2, FIG. 5 or FIG. 6. The processor module 634 of the touch sensitive processing apparatus 230 may execute instructions stored in non-volatile memory to fulfill the touch sensitive processing method 800. If there is no causal relationship, the present application does not limit the execution order of any two steps.

Step 801: start detection via two touch panels. Next, the flow proceeds to step 810 which is relevant to the first touch panel and step 815 which is relevant to the second touch panel.

Step 810: emitting first driving signals via one of the first electrodes of the first touch panel. The first driving signals may be transmitted from the driving circuit module 632 via the interconnection network module 631 to the first electrode.

Step 815: emitting second driving signals via one of the first electrodes of the second touch panel. The second driving signals may be transmitted from the driving circuit module 632 via the interconnection network module 631 to the first electrode.

In one embodiment, the first driving signals and the second driving signals may be identical. In an alternative embodiment, the magnitudes, duration, frequency and modulations of the first driving signals and the second driving signals may be different. The steps 810 and 815 may be performed simultaneously or in a time-sharing manner.

Step 820: when the first driving signals being transmitted at step 810, the sensing circuit module 633 connects the second electrodes of the first touch panel via the interconnection network module 631 to sense the first driving signals in order to get a first one-dimension sensing information. Each sensing information is corresponding to a sensing result of one of the second electrodes.

Step 825: when the second driving signals being transmitted at step 815, the sensing circuit module 633 connects the second electrodes of the second touch panel via the interconnection network module 631 to sense the second driving signals in order to get a second one-dimension sensing information. Each sensing information is corresponding to a sensing result of one of the second electrodes.

Step 830: determining whether all of the first electrodes of the first touch panel emits the first driving signals. If not, the flow relevant to the first touch panel returns to step 810. Otherwise, if yes, the flow relevant to the first touch panel proceeds to step 840.

Step 835: determining whether all of the first electrodes of the first touch panel emits the second driving signals. If not, the flow relevant to the first touch panel returns to step 815. Otherwise, if yes, the flow relevant to the first touch panel proceeds to step 845.

Step 840: forming a first two-dimension sensing information by the multiple first one-dimension sensing information according to the positions of the first electrodes emitting the first driving signal corresponding to the multiple first one-dimension sensing information.

Step 845: forming a second two-dimension sensing information by the multiple second one-dimension sensing information according to the positions of the first electrodes emitting the second driving signal corresponding to the multiple second one-dimension sensing information.

Step 850: according to the first two-dimension sensing information, detecting an external conductive object corresponding to the first touch panel. Next, in one embodiment, when the external conductive object is detected, the flow relevant to the first touch panel proceeds to step 860. Alternatively, the flow relevant to the first touch panel may directly proceed to step 870.

Step 855: according to the second two-dimension sensing information, detecting an external conductive object corresponding to the second touch panel. Next, in one embodiment, when the external conductive object is detected, the flow relevant to the second touch panel proceeds to step 865. Alternatively, the flow relevant to the second touch panel may directly proceed to step 875.

Optional step 860: according to the first two-dimension sensing information, detecting pressure values and a center of pressure of the external conductive object corresponding to the first panel.

Optional step 865: according to the second two-dimension sensing information, detecting pressure values and a center of pressure of the external conductive object corresponding to the second panel.

Step 870: reporting the positions of the external conductive objects gathered at steps 850 and 855 to the host 640. When the steps 860 or 865 is performed, the pressure values and centers of pressure of the external conductive objects may be also reported to the host 640.

In one embodiment, in order to cease detection when an object sandwiched by the two touch panels is detected, the touch sensitive processing method 800 may further comprises following step: when a first center of pressure of the first touch panel and a second center of pressure of the second touch panel detected are in two corresponding positions corresponding to the bending lines, cease executing steps 810~865.

In one embodiment, in order to detect the two touch panels contact each other, the touch sensitive processing method 800 may further comprises following step: determining whether the first and the second two-dimension sensing information present the pressure gradient patterns corresponding to the bending line; and when the determination result is positive, cease executing steps 810~865.

In one embodiment, in order to detect interferences happened to the two touch panels approaches to each other when at least one part of the transmission periods of the first and the second driving signals are overlapped, the touch sensitive processing method 800 may further comprises following step: determining whether the multiple second one-dimension sensing information is interfered by the first driving signals; and when the determination result is positive, performing the step 810 for emitting the first driving signals and the step 815 for emitting the second driving signals in different time periods.

According to the embodiments provided by the present application, multiple touch panels, separated by one or more bending lines, are provided to the top surface and/or bottom surface of a flexible electronic paper display. Each touch panel comprises multiple first electrodes and multiple second electrodes which intersect with each of the first electrodes. The first and the second electrodes are separated by an elastic layer. Each of the touch panel is corresponding to at least one part of four edges of the flexible electronic paper display such that the first and the second electrodes of the touch panel can connect to a touch sensitive processing apparatus through the part of the edge. The touch sensitive processing apparatus may at least use mutual-capacitance sensing to detect capacitance changes caused by distance variations between the first electrodes and the second electrodes. Accordingly, the touch sensitive processing apparatus can determine positions under pressure and/or pressure values which led to the distance variations.

According to an embodiment, the present application provides a flexible touch screen, comprising: a flexible display with a first bending line, wherein the first bending line separates the flexible display into a first part and a second part; and a first touch panel and a second touch panel disposed in different sides of the first bending line, wherein the first and the second touch panels attach to the flexible display, each of the first and the second touch panels comprises first electrodes and second electrodes which are connected with a touch sensitive processing apparatus, the first and the second electrodes intersect each other.

Preferably, in order to make better use of capacitance changes due to shorten distances between the first electrodes and the second electrodes, the first electrodes are disposed in a layer of first electrodes, the second electrodes are disposed in a layer of second electrodes, where the first electrodes intersect with the second electrodes there are elastic dielectric structures for preventing the first electrodes and the second electrodes being electrically coupled.

Preferably, in order to facilitate a design of electronic system having multiple bending lines, the flexible display has a second bending line which separates the second part of the flexible display into a third part and a fourth part, the flexible touch screen further comprises a third touch panel attaches to the flexible display, the second touch panel and the third touch panel are disposed at the third part and the fourth part, respectively, the third touch panel comprises the first electrodes and the second electrodes which are connected with the touch sensitive processing apparatus. Preferably, in order to realize fancy designs of electronic systems, the first bending line is not in parallel to the second bending line.

Preferably, in order to prevent reducing display quality of the flexible display and reducing electromagnetic interferences to touch panels, the flexible display is closer to a user than the first and the second touch panels, a top surface of the first and the second touch panels comprise an electromagnetic shielding layer and dielectric layer, respectively, and a bottom surface of the first and the second touch panels comprise an electromagnetic shielding layer coupled to a direct current potential and a dielectric layer, respectively.

Preferably, in order to increase touch sensitivities and reducing electromagnetic interferences to touch panels, the first and the second touch panels are closer to a user than the flexible display, the first and the second touch panels are made of transparent materials, the flexible touch screen further sequentially comprises a transparent dielectric layer and a transparent electromagnetic shielding layer between the first or the second touch panel and the flexible display, the transparent electromagnetic shielding layer is connected to a direct current potential.

Preferably, in order to increase design flexibility of electronic systems, the first and the second touch panels have one or any combination of following features: a quantity of the first electrodes of the first touch panel equals to a quantity of the first electrodes of the second touch panel; a quantity of the second electrodes of the first touch panel equals to a quantity of the second electrodes of the second touch panel; intervals of the first electrodes of the first touch panel equal to intervals of the first electrodes of the second touch panel; intervals of the second electrodes of the first touch panel equal to intervals of the second electrodes of the second touch panel; an area size of the first touch panel equals to an area size of the second touch panel; and a shape of the first touch panel equals to a shape of the second touch panel.

According to an embodiment, the present application provides a touch sensitive processing apparatus, adapted for a flexible touch screen, wherein the flexible touch screen comprising a flexible display with a first bending line, and a first touch panel and a second touch panel disposed in different sides of the first bending line, the first bending line separates the flexible display into a first part and a second part, the first and the second touch panels attach to the flexible display, each of the first and the second touch panels comprises first electrodes and second electrodes, the first and the second electrodes intersect each other, wherein the touch sensitive processing apparatus comprising: an interconnection network module, configured to connect the first electrodes and the second electrodes of the first and the second touch panels; a driving circuit module, configured to transmit driving signals via the interconnection network module; a sensing circuit module, configured to sense the driving signals via the interconnection network module; and a processor module, configured to execute instructions stored in non-volatile memory to realize following steps: have the driving circuit module takes turns to one of the first electrodes of the first touch panel emit first driving signals; have the driving circuit module takes turns to one of the first electrodes of the second touch panel emit second driving signals; when the first driving signals being emitted in turns, have the sensing circuit module to sense the first driving signals via the second electrodes of the first touch panel to get multiple first one-dimension sensing information; when the second driving signals being emitted in turns, have the sensing circuit module to sense the second driving signals via the second electrodes of the second touch panel to get multiple second one-dimension sensing information; forming a first two-dimension sensing information by the multiple first one-dimension sensing information according to positions of the first electrodes emitting the first driving signals corresponding to the multiple first one-dimension sensing information; forming a second two-dimension sensing information by the multiple second one-dimension sensing information according to positions of the first electrodes emitting the second driving signals corresponding to the multiple second one-dimension sensing information; and according to the first and the second two-dimension sensing information, detecting an external conductive object corresponding to the first and the second touch panels, respectively.

Preferably in order to provide pressure information of touch panel, the processor module is further configured to realize following step: according to the first and the second two-dimension sensing information, detecting pressure values and a center of pressures of an external conductive object corresponding to the first and the second touch panels, respectively. Preferably, in order to determine whether an object is sandwiched between the first and the second touch panels, the processor module is further configured to realize following step: determining whether a first center of pressure corresponding to the first touch panel and a second center of pressure corresponding to the second touch panel are at two corresponding positions with respect to the first bending line; and when the determination result is positive, ceasing following steps: the step of emitting the first driving signals, the step of emitting the second driving signals, the step of sensing the first driving signals, the step of sensing the second driving signals, the step of detecting an external conductive object corresponding to the first and the second touch panels, respectively, and the step of detecting pressure values and a center of pressures of an external conductive object corresponding to the first and the second touch panels, respectively.

Preferably, in order to determine whether the two touch panels contact each other, the processor module is further configured to realize following step: determining whether the first and the second two-dimension sensing information present pressure gradient patterns with respect to the first bending line; and when the determination result is positive, cease following steps: the step of emitting the first driving signals, the step of emitting the second driving signals, the step of sensing the first driving signals, the step of sensing the second driving signals, and the step of detecting an external conductive object corresponding to the first and the second touch panels, respectively.

Preferably, in order to determine whether the two touch panels are closed enough to being interfered by each other, when at least a part of the transmission periods of the first and the second driving signals is overlapped, the processor module is further configured to realize following step: determining whether the multiple second one-dimension sensing information is interfered by the first driving signal; and when the determination result is positive, performing the step of emitting the first driving signals and the step of emitting the second driving signals in different time periods.

According to an embodiment, the present application provides a touch sensitive processing method, adapted for a flexible touch screen, wherein the flexible touch screen comprising a flexible display with a first bending line, and a first touch panel and a second touch panel disposed in different sides of the first bending line, the first bending line separates the flexible display into a first part and a second part, the first and the second touch panels attach to the flexible display, each of the first and the second touch panels comprises first electrodes and second electrodes, the first and the second electrodes intersect each other, wherein the touch sensitive processing method comprising: taking turns to one of the first electrodes of the first touch panel emit first driving signals; taking turns to one of the first electrodes of the second touch panel emit second driving signals; when the first driving signals being emitted in turns, sensing the first driving signals via the second electrodes of the first touch panel to get multiple first one-dimension sensing information; when the second driving signals being emitted in turns, sensing the second driving signals via the second electrodes of the second touch panel to get multiple second one-dimension sensing information; forming a first two-dimension sensing information by the multiple first one-dimension sensing information according to positions of the first electrodes emitting the first driving signals corresponding to the multiple first one-dimension sensing information; forming a second two-dimension sensing information by the multiple second one-dimension sensing information according to positions of the first electrodes emitting the second driving signals corresponding to the multiple second one-dimension sensing information; and according to the first and the second two-dimension sensing information, detecting an external conductive object corresponding to the first and the second touch panels, respectively.

Preferably, in order to provide pressure information of touch panel, the touch sensitive processing method further comprises: according to the first and the second two-dimension sensing information, detecting pressure values and a center of pressures of an external conductive object corresponding to the first and the second touch panels, respectively. Preferably, in order to determine whether an object is sandwiched between the first and the second touch panels, the touch sensitive processing method further comprises: determining whether a first center of pressure corresponding to the first touch panel and a second center of pressure corresponding to the second touch panel are at two corresponding positions with respect to the first bending line; and when the determination result is positive, ceasing following steps: the step of emitting the first driving signals, the step of emitting the second driving signals, the step of sensing the first driving signals, the step of sensing the second driving signals, the step of detecting an external conductive object corresponding to the first and the second touch panels, respectively, and the step of detecting pressure values and a center of pressures of an external conductive object corresponding to the first and the second touch panels, respectively.

Preferably, in order to determine whether the two touch panels contact each other, the touch sensitive processing method further comprises: determining whether the first and the second two-dimension sensing information present pressure gradient patterns with respect to the first bending line; and when the determination result is positive, ceasing following steps: the step of emitting the first driving signals, the step of emitting the second driving signals, the step of sensing the first driving signals, the step of sensing the second driving signals, and the step of detecting an external conductive object corresponding to the first and the second touch panels, respectively.

Preferably, in order to determine whether the two touch panels are closed enough to being interfered by each other, when at least a part of the transmission periods of the first and the second driving signals is overlapped, the touch sensitive processing method further comprises: determining whether the multiple second one-dimension sensing information is interfered by the first driving signal; and when the determination result is positive, performing the step of emitting the first driving signals and the step of emitting the second driving signals in different time periods.

According to an embodiment, the present application provides an electronic system comprising the flexible touch screen and the touch sensitive processing apparatus.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A flexible touch screen, comprising:
a flexible display with a first bending line, wherein the first bending line separates the flexible display into a first part and a second part; and
a first touch panel and a second touch panel disposed in different sides of the first bending line, wherein the first and the second touch panels attach to the flexible display, each of the first and the second touch panels comprises first electrodes and second electrodes which are connected with a touch sensitive processing apparatus, the first and the second electrodes intersect each other,
wherein the flexible display is closer to a user than the first and the second touch panels, a top surface of the first and the second touch panels comprise an electromagnetic shielding layer and dielectric layer, respectively, and a bottom surface of the first and the second touch panels comprise an electromagnetic shielding layer coupled to a direct current potential and a dielectric layer, respectively.

2. The flexible touch screen as claimed as claim 1, wherein the first electrodes are disposed in a layer of first electrodes, the second electrodes are disposed in a layer of second electrodes, where the first electrodes intersect with the second electrodes there are elastic dielectric structures for preventing the first electrodes and the second electrodes being electrically coupled.

3. The flexible touch screen as claimed as claim 1, wherein the first and the second touch panels have one or any combination of following features:
a quantity of the first electrodes of the first touch panel equals to a quantity of the first electrodes of the second touch panel;
a quantity of the second electrodes of the first touch panel equals to a quantity of the second electrodes of the second touch panel;
intervals of the first electrodes of the first touch panel equal to intervals of the first electrodes of the second touch panel;
intervals of the second electrodes of the first touch panel equal to intervals of the second electrodes of the second touch panel;
an area size of the first touch panel equals to an area size of the second touch panel; and
a shape of the first touch panel equals to a shape of the second touch panel.

4. A flexible touch screen, comprising:
a flexible display with a first bending line, wherein the first bending line separates the flexible display into a first part and a second part; and
a first touch panel and a second touch panel disposed in different sides of the first bending line, wherein the first and the second touch panels attach to the flexible display, each of the first and the second touch panels comprises first electrodes and second electrodes which are connected with a touch sensitive processing apparatus, the first and the second electrodes intersect each other,
wherein the first and the second touch panels are closer to a user than the flexible display, the first and the second touch panels are made of transparent materials, the flexible touch screen further sequentially comprises a transparent dielectric layer and a transparent electromagnetic shielding layer between the first or the second touch panel and the flexible display, the transparent electromagnetic shielding layer is connected to a direct current potential.

5. The flexible touch screen as claimed as claim 4, wherein the first electrodes are disposed in a layer of first electrodes, the second electrodes are disposed in a layer of second electrodes, where the first electrodes intersect with the second electrodes there are elastic dielectric structures for preventing the first electrodes and the second electrodes being electrically coupled.

6. The flexible touch screen as claimed as claim 4, wherein the first and the second touch panels have one or any combination of following features:
a quantity of the first electrodes of the first touch panel equals to a quantity of the first electrodes of the second touch panel;

a quantity of the second electrodes of the first touch panel equals to a quantity of the second electrodes of the second touch panel;

intervals of the first electrodes of the first touch panel equal to intervals of the first electrodes of the second touch panel;

intervals of the second electrodes of the first touch panel equal to intervals of the second electrodes of the second touch panel;

an area size of the first touch panel equals to an area size of the second touch panel; and a shape of the first touch panel equals to a shape of the second touch panel.

7. A touch sensitive processing apparatus, adapted for a flexible touch screen, wherein the flexible touch screen comprising a flexible display with a first bending line, and a first touch panel and a second touch panel disposed in different sides of the first bending line, the first bending line separates the flexible display into a first part and a second part, the first and the second touch panels attach to the flexible display, each of the first and the second touch panels comprises first electrodes and second electrodes, the first and the second electrodes intersect each other, wherein the touch sensitive processing apparatus comprising:

an interconnection network module, configured to connect the first electrodes and the second electrodes of the first and the second touch panels;

a driving circuit module, configured to transmit driving signals via the interconnection network module;

a sensing circuit module, configured to sense the driving signals via the interconnection network module; and a processor module, configured to execute instructions stored in non-volatile memory to realize following steps:

have the driving circuit module takes turns to one of the first electrodes of the first touch panel emit first driving signals;

have the driving circuit module takes turns to one of the first electrodes of the second touch panel emit second driving signals;

when the first driving signals being emitted in turns, have the sensing circuit module to sense the first driving signals via the second electrodes of the first touch panel to get multiple first one-dimension sensing information;

when the second driving signals being emitted in turns, have the sensing circuit module to sense the second driving signals via the second electrodes of the second touch panel to get multiple second one-dimension sensing information;

forming a first two-dimension sensing information by the multiple first one-dimension sensing information according to positions of the first electrodes emitting the first driving signals corresponding to the multiple first one-dimension sensing information;

forming a second two-dimension sensing information by the multiple second one-dimension sensing information according to positions of the first electrodes emitting the second driving signals corresponding to the multiple second one-dimension sensing information; and according to the first and the second two-dimension sensing information, detecting an external conductive object corresponding to the first and the second touch panels, respectively.

8. The touch sensitive processing apparatus as claimed in claim 7, wherein the processor module is further configured to realize following step:

according to the first and the second two-dimension sensing information, detecting pressure values and a center of pressures of an external conductive object corresponding to the first and the second touch panels, respectively.

9. The touch sensitive processing apparatus as claimed in claim 8, wherein the processor module is further configured to realize following step:

determining whether a first center of pressure corresponding to the first touch panel and a second center of pressure corresponding to the second touch panel are at two corresponding positions with respect to the first bending line; and when the determination result is positive, ceasing following steps: the step of emitting the first driving signals, the step of emitting the second driving signals, the step of sensing the first driving signals, the step of sensing the second driving signals, the step of detecting an external conductive object corresponding to the first and the second touch panels, respectively, and the step of detecting pressure values and a center of pressures of an external conductive object corresponding to the first and the second touch panels, respectively.

10. The touch sensitive processing apparatus as claimed in claim 7, wherein the processor module is further configured to realize following step:

determining whether the first and the second two-dimension sensing information present pressure gradient patterns with respect to the first bending line; and when the determination result is positive, cease following steps: the step of emitting the first driving signals, the step of emitting the second driving signals, the step of sensing the first driving signals, the step of sensing the second driving signals, and the step of detecting an external conductive object corresponding to the first and the second touch panels, respectively.

11. The touch sensitive processing apparatus as claimed in claim 7, wherein when at least a part of transmission periods of the first and the second driving signals is overlapped, wherein the processor module is further configured to realize following step:

determining whether the multiple second one-dimension sensing information is interfered by the first driving signal; and when the determination result is positive, performing the step of emitting the first driving signals and the step of emitting the second driving signals in different time periods.

12. A touch sensitive processing method, adapted for a flexible touch screen, wherein the flexible touch screen comprising a flexible display with a first bending line, and a first touch panel and a second touch panel disposed in different sides of the first bending line, the first bending line separates the flexible display into a first part and a second part, the first and the second touch panels attach to the flexible display, each of the first and the second touch panels comprises first electrodes and second electrodes, the first and the second electrodes intersect each other, wherein the touch sensitive processing method comprising:

taking turns to one of the first electrodes of the first touch panel emit first driving signals;

taking turns to one of the first electrodes of the second touch panel emit second driving signals;

when the first driving signals being emitted in turns, sensing the first driving signals via the second electrodes of the first touch panel to get multiple first one-dimension sensing information;

when the second driving signals being emitted in turns, sensing the second driving signals via the second electrodes of the second touch panel to get multiple second one-dimension sensing information;

forming a first two-dimension sensing information by the multiple first one-dimension sensing information according to positions of the first electrodes emitting the first driving signals corresponding to the multiple first one-dimension sensing information;

forming a second two-dimension sensing information by the multiple second one-dimension sensing information according to positions of the first electrodes emitting the second driving signals corresponding to the multiple second one-dimension sensing information; and according to the first and the second two-dimension sensing information, detecting an external conductive object corresponding to the first and the second touch panels, respectively.

13. The touch sensitive processing method as claimed in claim 12, further comprises:

according to the first and the second two-dimension sensing information, detecting pressure values and a center of pressures of an external conductive object corresponding to the first and the second touch panels, respectively.

14. The touch sensitive processing method as claimed in claim 13, further comprises:

determining whether a first center of pressure corresponding to the first touch panel and a second center of pressure corresponding to the second touch panel are at two corresponding positions with respect to the first bending line; and when the determination result is positive, ceasing following steps: the step of emitting the first driving signals, the step of emitting the second driving signals, the step of sensing the first driving signals, the step of sensing the second driving signals, the step of detecting an external conductive object corresponding to the first and the second touch panels, respectively, and the step of detecting pressure values and a center of pressures of an external conductive object corresponding to the first and the second touch panels, respectively.

15. The touch sensitive processing method as claimed in claim 12, further comprises:

determining whether the first and the second two-dimension sensing information present pressure gradient patterns with respect to the first bending line; and when the determination result is positive, ceasing following steps: the step of emitting the first driving signals, the step of emitting the second driving signals, the step of sensing the first driving signals, the step of sensing the second driving signals, and the step of detecting an external conductive object corresponding to the first and the second touch panels, respectively.

16. The touch sensitive processing method as claimed in claim 12, wherein when at least a part of transmission periods of the first and the second driving signals is overlapped, wherein the touch sensitive processing method further comprises:

determining whether the multiple second one-dimension sensing information is interfered by the first driving signal; and when the determination result is positive, performing the step of emitting the first driving signals and the step of emitting the second driving signals in different time periods.

17. An electronic system, comprising:

a flexible touch screen, comprising:

a flexible display with a first bending line, wherein the first bending line separates the flexible display into a first part and a second part; and a first touch panel and a second touch panel disposed in different sides of the first bending line, the first and the second touch panels attach to the flexible display, each of the first and the second touch panels comprises first electrodes and second electrodes, the first and the second electrodes intersect each other; and a touch sensitive processing apparatus, comprising:

an interconnection network module, configured to connect the first electrodes and the second electrodes of the first and the second touch panels;

a driving circuit module, configured to transmit driving signals via the interconnection network module;

a sensing circuit module, configured to sense the driving signals via the interconnection network module; and a processor module, configured to execute instructions stored in non-volatile memory to realize following steps:

have the driving circuit module takes turns to one of the first electrodes of the first touch panel emit first driving signals;

have the driving circuit module takes turns to one of the first electrodes of the second touch panel emit second driving signals;

when the first driving signals being driven in turns, have the sensing circuit module to sense the first driving signals via the second electrodes of the first touch panel to get multiple first one-dimension sensing information;

when the second driving signals being driven in turns, have the sensing circuit module to sense the second driving signals via the second electrodes of the second touch panel to get multiple second one-dimension sensing information;

forming a first two-dimension sensing information by the multiple first one-dimension sensing information according to positions of the first electrodes emitting the first driving signals corresponding to the multiple first one-dimension sensing information;

forming a second two-dimension sensing information by the multiple second one-dimension sensing information according to positions of the first electrodes emitting the second driving signals corresponding to the multiple second one-dimension sensing information; and according to the first and the second two-dimension sensing information, detecting an external conductive object corresponding to the first and the second touch panels, respectively.

\* \* \* \* \*